US006757433B1

(12) United States Patent
Lee

(10) Patent No.: US 6,757,433 B1
(45) Date of Patent: Jun. 29, 2004

(54) OBJECT-BASED QUAD-TREE MESH MOTION COMPENSATION METHOD USING GREEDY ALGORITHM

(75) Inventor: Jun-seo Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 575 days.

(21) Appl. No.: 09/649,085

(22) Filed: Aug. 28, 2000

(30) Foreign Application Priority Data

Aug. 27, 1999 (KR) .......................................... 99-35840

(51) Int. Cl.$^7$ ................................................ G06K 9/36
(52) U.S. Cl. .................... 382/236; 382/240; 348/407.1; 348/420.1
(58) Field of Search ................................ 382/107, 236, 382/238–253; 375/240; 348/404.1–421.1

(56) References Cited

U.S. PATENT DOCUMENTS

| 5,768,434 A | * | 6/1998 | Ran ............................ 382/240 |
| 6,084,908 A | * | 7/2000 | Chiang et al. ......... 375/240.03 |
| 6,392,705 B1 | * | 5/2002 | Chaddha .................. 348/388.1 |

OTHER PUBLICATIONS

"Classified Variable Block Size Motion Estimation Algorithm for Image Sequence Coding" by Huang et al. Image Processing, 1994. Proceedings. ICIP–94., IEEE International Conference, vol.: 3, Nov. 13–16, 1994 □□page(s): 736–740 vol. 3.*
"A Motion Estimation and Image Segmentation Technique Based on the Variable Block size" by Yeo et al. Acoustics, Speech, and Signal Processing, 1997. ICASSP–97., 1997 IEEE International Conference on, vol.: 4, Apr. 21–24 1997, Page(s): 3137–3140 vol. 4.*
"Motion Compensation for Video Compression Using Control Grid Interpolation" by Sullivan et al. Acoustics, Speech, and Signal Processing, 1991. ICASSP–91., 1991 International Conference on, Apr. 14–17, 1991 Page(s): 2713–2716 vol. 4.*
"A Novel Video Coding Scheme Based on Temporal Predication Using Digital Image Warping" by Nieweglowski et al. Consumer Electronics, IEEE Transactions on , vol.: 39 Issue: 3, Jun. 8–10, 1993, Page(s): 141–150.*

* cited by examiner

Primary Examiner—Amelia M. Au
Assistant Examiner—Charles Kim
(74) Attorney, Agent, or Firm—Sughrue Mion, PLLC

(57) ABSTRACT

An object-based quad-tree mesh motion compensation method using the Greedy algorithm is provided. This method defines an object-based quad-tree mesh structure defined by extending a hierarchical grid interpolation technique, by which complicated or partial motion is more accurately displayed, so that it is suitable for an object-based technique. Also, this method provides a quad-tree block segmentation method using the Greedy algorithm by which the transmission rate-distortion performance of motion compensation is improved. The object-based quad-tree mesh motion compensation method using the Greedy algorithm, includes (a) defining an object-based quad-tree mesh, (b) segmenting each block in an image frame, which is segmented into blocks of predetermined sizes, in order to form the object-based quad-tree mesh of the step (a), and (c) estimating the motions of vertices to minimize distortion during compensation of motions within the segmented block, and compensating for the motion of an image within the block. Here, the object-based quad-tree mesh is extensively defined so that it is suitable for an object-based technique, and quad-tree blocks are classified into virtual quadrature blocks not including any part of an object, and real quadrature blocks including part of an object, according to the type of object.

3 Claims, 5 Drawing Sheets

$MV_1 = (MV_x + MV_b)/2$
$MV_3 = (MV_1 + MV_x)/2$
$MV_2 = (MV_1 + MV_o)/2$ (a)

PREVIOUS FRAME (b)

CURRENT FRAME

CPs MOTION-ESTIMATED DURING ΔD CALCULATION (a)

■ : CURRENT BLOCK

▒ : DQs WHICH ARE AFFECTED BY SEGMENTED BLOCK

• : MOTION-ESTIMATED CPs

BLOCKS, SEGMENTATION GAIN OF EACH OF WHICH IS UPDATED AFTER SEGMENTATION (b)

■ : SEGMENTED BLOCK

▒ : BLOCKS WHICH REQUIRE SEGMENTATION GAIN UPDATE

OBJECT-BASED QUAD-TREE MESH MOTION COMPENSATION METHOD USING GREEDY ALGORITHM

BACKGROUND OF THE INVENTION

1. Field of the Invention

The present invention relates to a motion compensation method, and more particularly, to an object-based quad-tree mesh motion compensation method using a Greedy algorithm.

2. Description of the Related Art

A motion compensation technique, by which the amount of data is reduced by taking advantage of the redundancy of a moving picture on the time axis, is essential for moving picture encoding. In order to achieve motion compensation by which complicated or partial motion can be accurately represented, a conventional hierarchical grid interpolation (HGI) technique defines a quad-tree mesh structure for frame-unit moving picture encoding.

FIG. 1 is a block diagram schematically illustrating an HGI technique. First, quad-tree block segmentation is performed on a current image frame ($I_t$) on the basis of the variance of frame difference (VFD) of each block in the frame, in a block 100. To be more specific, first, a current image frame is segmented into square blocks having predetermined sizes. If the VFD of each block is greater than the reference value, the block is again divided into four square blocks having the same size. This process is repeated until the VFDs of all of the divided blocks are smaller than the reference value. Here, VFD denotes the variance of the frame difference between the current image frame ($I_t$) and the previous image frame ($I_{t-1}$).

Next, the motions of vertices are estimated from a quad-tree block segmentation result $S_t$ to minimize motion compensation errors within blocks, and quad-tree mesh motion compensation is performed on the image signals within the block by interpolation using the estimation, as in element 102. As a consequence, a motion-compensated image ($\hat{I}_t$) and a motion vector $M_t$ corresponding to the current image frame ($I_t$) are obtained.

FIGS. 2(a) and 2(b) show the quad-tree blocks of a previous frame matched with the current frame by a quad-tree mesh structure. Each block can be transformed, so that complicated motions can be accurately compensated. Here, bound vertices (for example, 1, 2, . . . , 10 in FIG. 2(a)) are defined to maintain the shape of each block to be rectangular, and motion vectors (for example, $MV_1$ through $MV_3$ in FIG. 2(b)) are obtained by linear interpolation using the motion vector of two adjacent vertices. On the other hand, motion estimation is performed on control points (for example, o, p, . . . , y in FIG. 2(a)), the motion vectors of which must be estimated, to minimize an image frame motion compensation error. The motion vector of each pixel within a block is obtained by linear interpolation, using the motion vector of each estimated vertex, thereby compensating for the motion within a block.

Segmented quad-tree information is encoded and transmitted as described below. While each node in a quad-tree starting from root nodes is visited in a breadth-first system, the nodes are encoded '0' or '1' depending on whether they are terminal nodes. However, a minimum-sized block does not need to be encoded with '0'. The motion vector of each of the control points is fixed length encoded.

A conventional motion compensation technique is for frame-based moving picture encoding, so that it is not suitable for object-based moving picture encoding. Block segmentation in a quad-tree structure reduces motion compensation error, but the transmission rate increases due to increments in quad-tree information and motion vector information caused by segmentation. Hence, the decision of the part of an image to be further segmented is related directly to the transmission rate-distortion performance, which is a scale indicating the effective utilization of a given transmission rate. However, in the prior art, quad-tree block segmentation and motion estimation are separately performed, so that the transmission rate-distortion performance is not directly considered.

SUMMARY OF THE INVENTION

An objective of the present invention is to provide a motion compensation method which defines an object-based quad-tree mesh structure capable of accurately compensating for complicated and partial motion.

Another objective of the present invention is to provide a block segmentation method in an object-based quad-tree mesh motion compensation method using the Greedy algorithm, by which the transmission rate-distortion performance of an object-based quad-tree mesh structure is improved.

To achieve the first objective, the present invention provides an object-based quad-tree mesh motion compensation method using the Greedy algorithm, the method including: (a) defining an object-based quad-tree mesh; (b) segmenting each block in an image frame, which is segmented into blocks of predetermined sizes, in order to form the object-based quad-tree mesh of the step (a); and (c) estimating the motions of vertices to minimize distortion during compensation of motions within the segmented block, and compensating for the motion of an image within the block. Here, the object-based quad-tree mesh is extensively defined so that it is suitable for an object-based technique, and quad-tree blocks are classified into virtual quadrature blocks not including any part of an object, and real quadrature blocks including part of an object, according to the type of object.

To achieve the second objective, the present invention provides a block segmentation method in an object-based quad-tree mesh motion compensation method using the Greedy algorithm, the method including: (a) forming blocks of predetermined sizes which surround an object within an image; (b) segmenting each block to form an object-based quad-tree mesh; (c) calculating the segmentation gains of the segmented blocks; (d) again segmenting the block having a maximum segmentation gain to form an object-based quad-tree mesh; (e) again calculating the segmentation gains of blocks which are affected by the segmentation of the step (d); and (f) returning to the step (d) if a current transmission rate is smaller than a given transmission rate.

BRIEF DESCRIPTION OF THE DRAWINGS

The above objectives and advantage of the present invention will become more apparent by describing in detail a preferred embodiment thereof with reference to the attached drawings in which.

DESCRIPTION OF THE PREFERRED EMBODIMENT

The present invention concerns a recent low transmission rate high compression encoding technique, and a motion compensation method for object-based moving picture encoding adopted by MPEG-4 and MPEG-7 for content-based multimedia application. In particular, the present invention extensively defines a motion compensation method using a quad-tree mesh structure which is effective for a moving picture including complicated or partial motion, in order to achieve object-based moving picture encoding. In the present invention, the transmission rate-distortion performance is improved using a Greedy algorithm.

Figure 1:
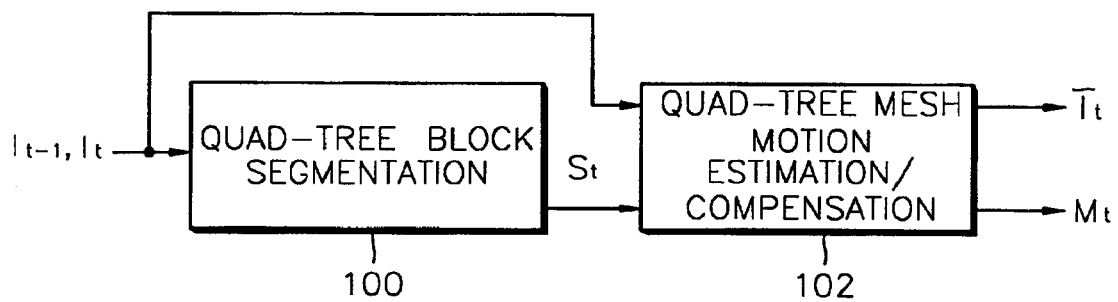
FIG. 1 is a block diagram schematically illustrating a hierarchical grid interpolation technique.
Figure 2:
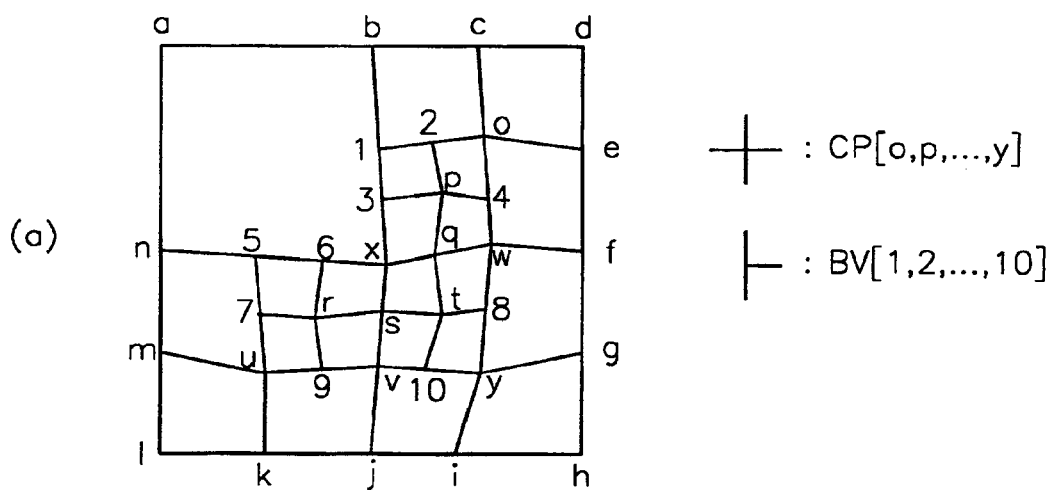
FIGS. 2(a) and 2(b) show the quad-tree blocks of a previous frame, which are matched with the current frame by a quad-tree mesh structure.
Figure 2:
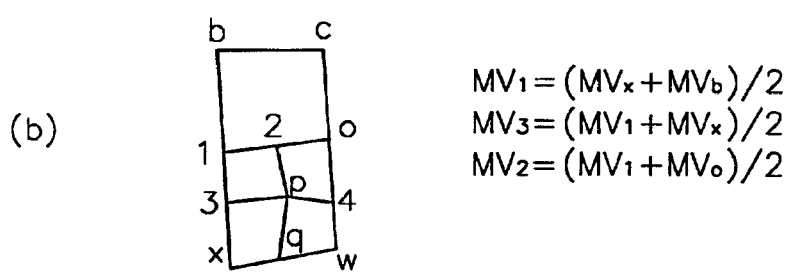
Figure 3:
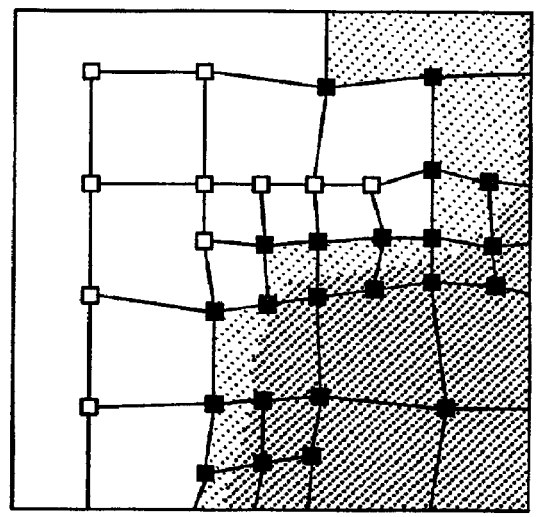
FIGS. 3(a) and (b) are conceptual views of object-based quad-tree mesh structures according to the present invention.
Figure 3:
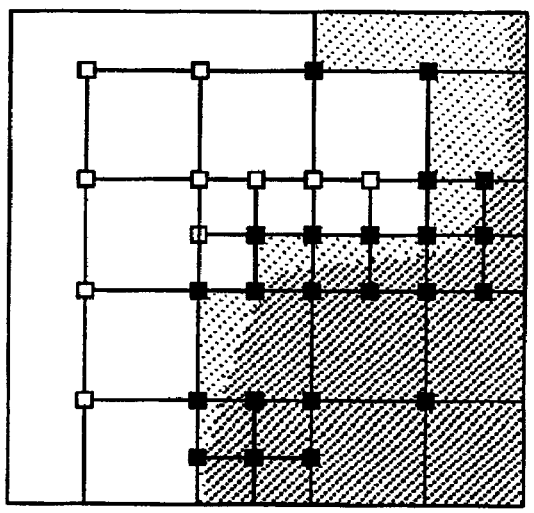
Figure 3:
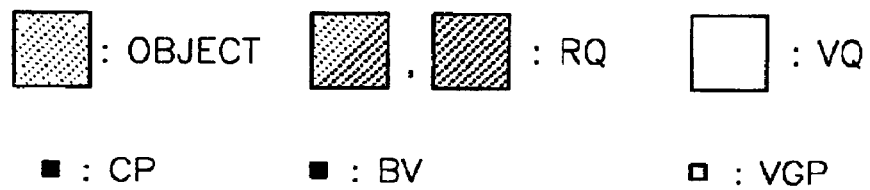

FIG. 3 is a conceptual view of an object-based quad-tree mesh structure according to the present invention. The object-based quad-tree mesh structure according to the present invention defines control points CPs: and bound vertices BVs as in the prior art, and also the following items, in order to be applied to object-based moving picture encoding. First, quad-tree blocks are classified into a virtual quadrature (VQ) block and a real quadrature (RQ) block. The virtual quadrature (VQ) block does not include any part of an object, and the real quadrature (RQ) block includes part of an object.

Grid points are classified into virtual grid points (VGP), control points (CP) and bound vertices (BV). The virtual grid points (VGP) are vertices which are surrounded by virtual quadrature (VQ) blocks. The control points (CP) each form a cross shape by connecting to 4 other vertices, and are in contact with at least one real quadrature (RQ) block or exist on the outside regions closest to an object, to achieve motion compensation of object boundary regions. In contrast to the virtual grid points (VGP) and the bound vertices (BV), the control points (CPs) have motion vectors to be independently transmitted. The bound vertices (BVs) are vertices which contact an RQ block that is the largest block among blocks which contact the bound vertices, and each of which forms a letter T shape by connection of a vertex with three other vertices.

As described above, vertices for real quadrature (RQ) blocks in the present invention are classified into control points (CPs) and bound vertices (BVs), similar to the prior art. The bound vertices (BVs) in the prior art are defined so that a motion field is obtained by simple linear interpolation. However, in the present invention, vertices, in which the largest contacting block is a virtual quadrature (VQ) block, among the bound vertices (BVs), are classified into control points (CPs) in order to more accurately compensate for the motion of an object boundary portion, and since only the motion field for real quadrature (RQ) blocks are required to achieve the motion compensation of an object.

Thus, an object-based quad-tree mesh structure according to the present invention is defined by extending a quad-tree mesh structure, which is capable of accurately compensating for complicated and partial motions, so that it is suitable for an object-based moving picture encoding technique.

Figure 4:
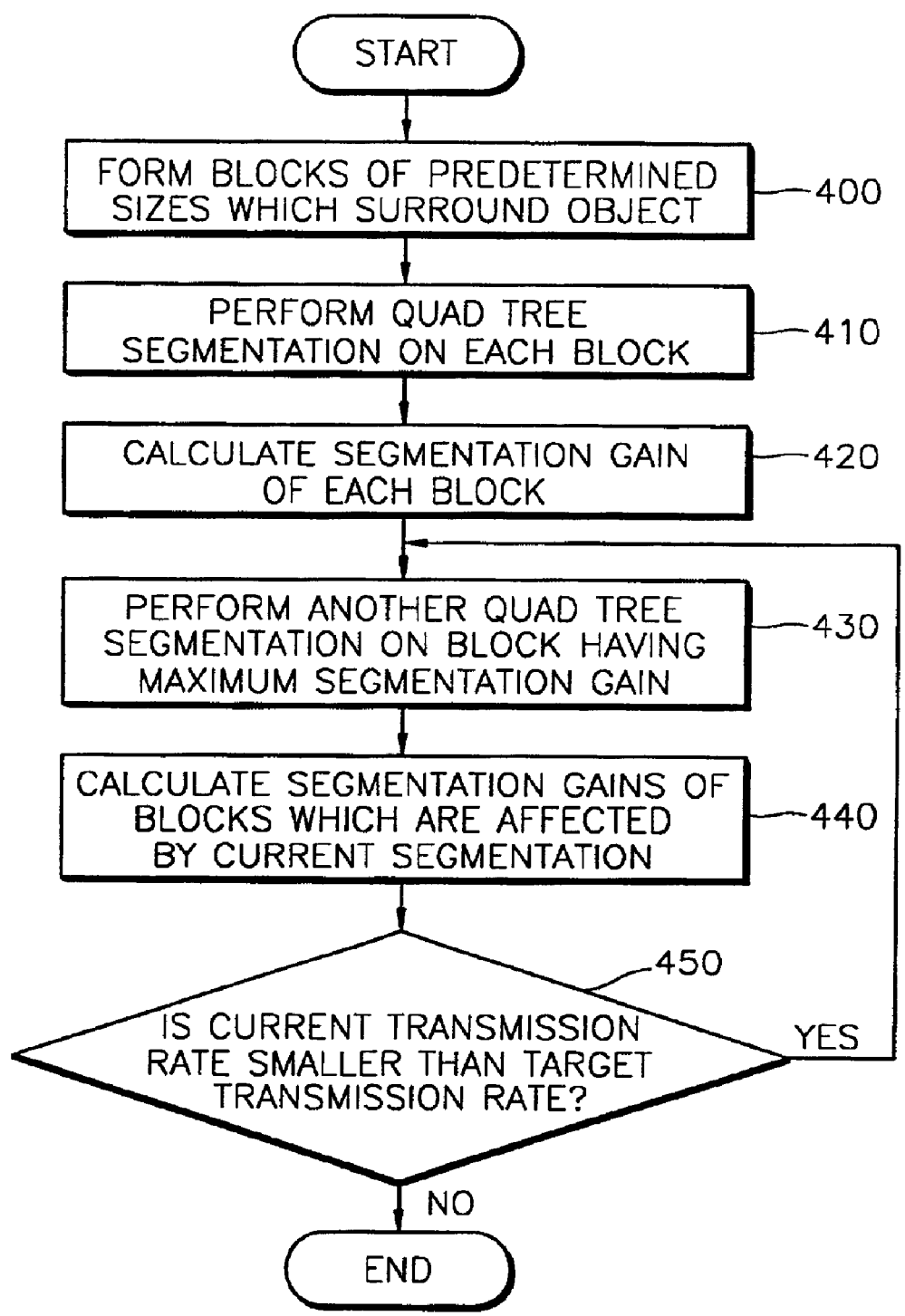
FIG. 4 is a flowchart illustrating a quad-tree block segmentation method using a Greedy algorithm.

FIG. 4 is a flowchart illustrating a quad-tree block segmentation method using the Greedy algorithm. The quad-tree block segmentation method, which is a block segmentation method in an object-based quad-tree mesh, is used to improve the performance in terms of transmission rate-distortion. First, predetermined-sized blocks which surround an object within an image, that is, root blocks, are formed in the initial step, in step 400. Each root block is quad-tree segmented, in step 410. When each root block has been motion-compensated, the ratio of a decrement in motion compensation error to an increment in motion vectors and quad-tree encoding bits from before quad-tree segmentation is calculated, in step 420. Here, the ratio is referred to as a segmentation gain.

In a present state of being quad-tree segmented, a block having the greatest segmentation gain is again quad-tree segmented, in step 430. The segmentation gains of blocks which are affected by the segmentation are again obtained, in step 440. It is determined whether a current transmission rate is smaller than a target transmission rate, in step 450. If it is determined that the current transmission rate is smaller than the target transmission, the procedure is fed back to the step 430, and the above-described operations are repeated until a given transmission rate is completely consumed.

Figure 5:
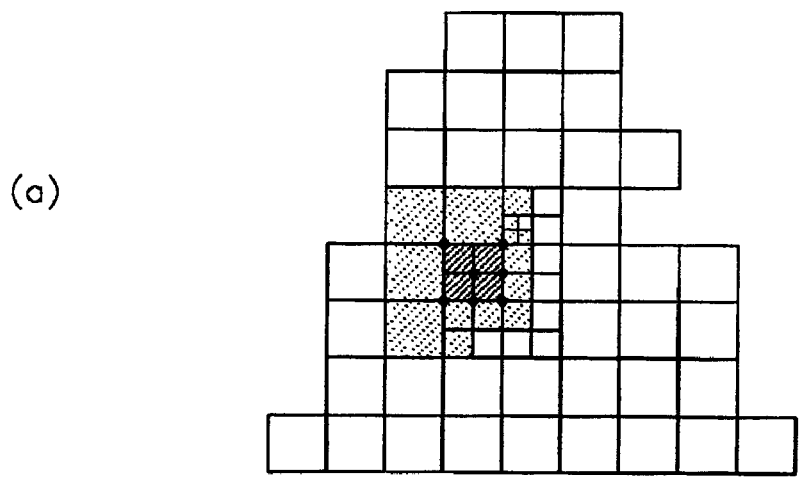
FIGS. 5(a) and (b) illustrate restriction of peripheral blocks which are affected by segmentation.
Figure 5:
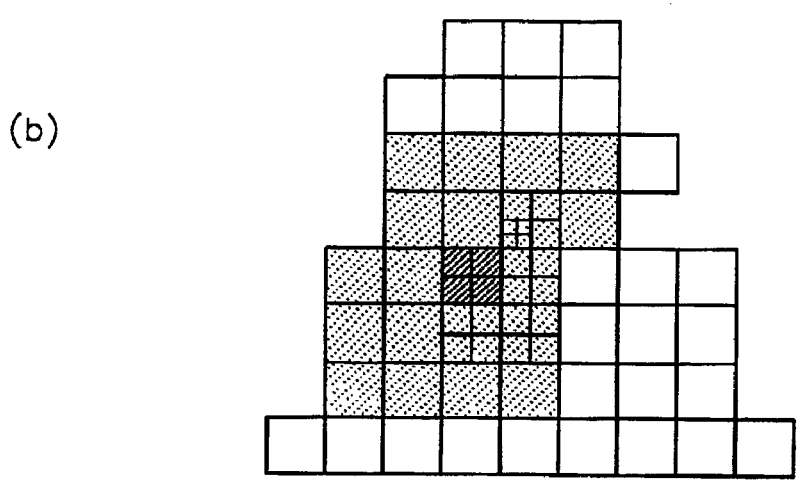

In the step 420, the motions of control points (CPs) are estimated to calculate segmentation gains. In order to obtain segmentation gains when a block is quad-tree segmented, the motion vectors of control points (CPs) associated with the block are re-estimated. In a quad-tree mesh structure, all control points (CPs) within a frame are affected by each other. In order to simplify calculation, only the control points (CPs) on segmented blocks are again motion-estimated, as shown in FIG. 5(a). In this case, blocks which are affected by segmentation are determined as in FIG. 5(b). Therefore, the segmentation gains of these blocks are again obtained.

Figure 6:
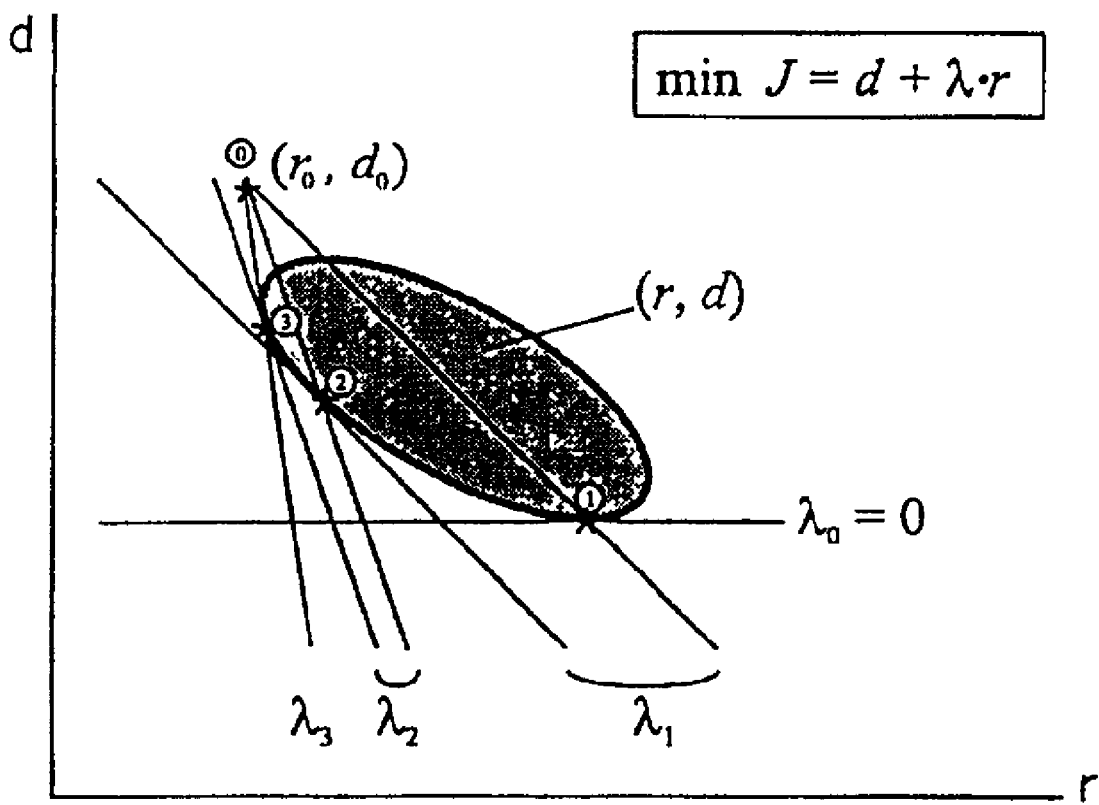
FIG. 6 is a view for illustrating a method of calculating the maximum segmentation gain of individual blocks.

FIG. 6 is a view for illustrating a method of calculating the maximum segmentation gain of individual blocks. In the step 430, the maximum segmentation gain of each block is calculated by the method described below. In order to perform Greedy-style quad-tree block segmentation, first, motion estimation must be performed so that the segmentation gain of each block is maximum. In FIG. 6, the horizontal axis represents the transmission rate r by each block, and the vertical axis represents motion compensation distortion d. ($r_0$, $d_0$) corresponds to a state before segmentation, and a black-colored portion includes states which can be reached according to motion estimation after segmentation. The maximum segmentation gain can be obtained at ③ of FIG. 6, so that motion estimation is performed by the following method.

First, (r, d) is calculated by performing motion estimation to minimize motion compensation distortion d. Next, the negative number of an inclination of (r, d) from ($r_0$, $d_0$) is set to be $\lambda$. Then, motion estimation is performed to minimize a Lagrangian function $J=d+\lambda*r$. The second and third operations are repeated until $\lambda$ is converged. Here, converged $\lambda$ is the maximum segmentation gain that can be obtained by the block, and the motion vector obtained by the repetition of operations is stored. However, when a motion vector is fixed length encoded, a variation of the transmission rate r is fixed, so that motion estimation is performed without application of the above-described repeated operation to minimize only the motion compensation distortion d.

As described above, in an object-based quad-tree mesh motion compensation method using the Greedy algorithm according to the present invention, complicated or partial motion is accurately compensated, and the transmission rate-distortion performance of motion compensation is improved by an effective utilization of a given transmission rate. Also, when the object-based quad-tree mesh motion compensation method is applied to an object-based moving picture encoding technique, a compression rate is increased.

What is claimed is:

1. A block segmentation method in an object-based quad-tree mesh motion compensation method using the Greedy algorithm, the method comprising:

(a) forming blocks of predetermined sizes which surround an object within an image;

(b) segmenting each block to form an object-based quad-tree mesh;

(c) calculating the segmentation gains of the segmented blocks;

(d) again segmenting the block having a maximum segmentation gain to form an object-based quad-tree mesh;

(e) again calculating the segmentation gains of blocks which are affected by the segmentation of the step (d); and (f) returning to the step (d) if a current transmission rate is smaller than a given transmission rate.

2. The block segmentation method of claim 1, wherein in the step (c), the segmentation gain of a block to be segmented is calculated by estimating the motion vectors of associated control points around the block.

3. The block segmentation method of claim 2, wherein in the step (c), motion vectors are estimated to minimize a Lagrangian function $J=d+\lambda*r$ (where d denotes motion compensation distortion, r denotes a transmission rate, $\lambda$ denotes a negative number of an inclination of (r, d) from ($r_0$, $d_0$), ($r_0$, $d_0$) is a value before segmentation, (r, d) is a value obtained by motion estimation).

* * * * *